US012629897B2

(12) United States Patent
Schaeffer et al.

(10) Patent No.: US 12,629,897 B2
(45) Date of Patent: May 19, 2026

(54) SONOTRODE, SYSTEM AND METHOD OF RESHAPING A CONNECTING ELEMENT

(71) Applicant: HERRMANN ULTRASCHALLTECHNIK GMBH & CO. KG, Karlsbad (DE)

(72) Inventors: Marshall Schaeffer, Algonquin, IL (US); Robert Decoursey, Saint Charles, IL (US); Andrew Splett, Hoffmann Estates, IL (US)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 113 days.

(21) Appl. No.: 18/707,200

(22) PCT Filed: Nov. 11, 2022

(86) PCT No.: PCT/EP2022/081657
§ 371 (c)(1),
(2) Date: May 3, 2024

(87) PCT Pub. No.: WO2023/084046
PCT Pub. Date: May 19, 2023

(65) Prior Publication Data
US 2024/0375358 A1     Nov. 14, 2024

Related U.S. Application Data

(60) Provisional application No. 63/278,688, filed on Nov. 12, 2021.

(51) Int. Cl.
| *B29C 65/08* | (2006.01) |
| *B29C 65/00* | (2006.01) |
| *B29C 65/60* | (2006.01) |

(52) U.S. Cl.
CPC ............ *B29C 65/606* (2013.01); *B29C 65/08* (2013.01); *B29C 66/81423* (2013.01)

(58) Field of Classification Search
CPC ..... B29C 65/08; B29C 65/606; B29C 65/607; B29C 66/81422; B29C 66/81423; B29C 66/81429; B29C 66/81431
(Continued)

(56) References Cited

U.S. PATENT DOCUMENTS 7,921,538 B2 *   4/2011   Denslow ................. B29C 65/08
                                                        29/243.517
2020/0130724 A1    4/2020   Vizier et al.

FOREIGN PATENT DOCUMENTS

JP          2001-171008 A      6/2001

* cited by examiner

*Primary Examiner* — James D Sells
(74) *Attorney, Agent, or Firm* — Hudak, Shunk & Farine Co. LPA

(57)          ABSTRACT

A sonotrode for reshaping a connecting element to form a closing head of a rivet including a cavity at least partially having the negative shape of the closing head to be formed, wherein the cavity provides a contact surface designed to come in contact with the connecting element during reshaping, wherein the sonotrode defines a longitudinal axis (l), and wherein the contact surface in a cross section in at least one first plane parallel to the longitudinal axis (l) includes a first contour with a convex shaped outer section, so that a line connecting two points within the convex shaped outer section extends through the sonotrode and not through the cavity. A system including a sonotrode and a connecting element and to a method of reshaping a connecting element.

19 Claims, 12 Drawing Sheets

(58) Field of Classification Search
USPC ........................................................ 156/73.1
See application file for complete search history.

(Derivative)

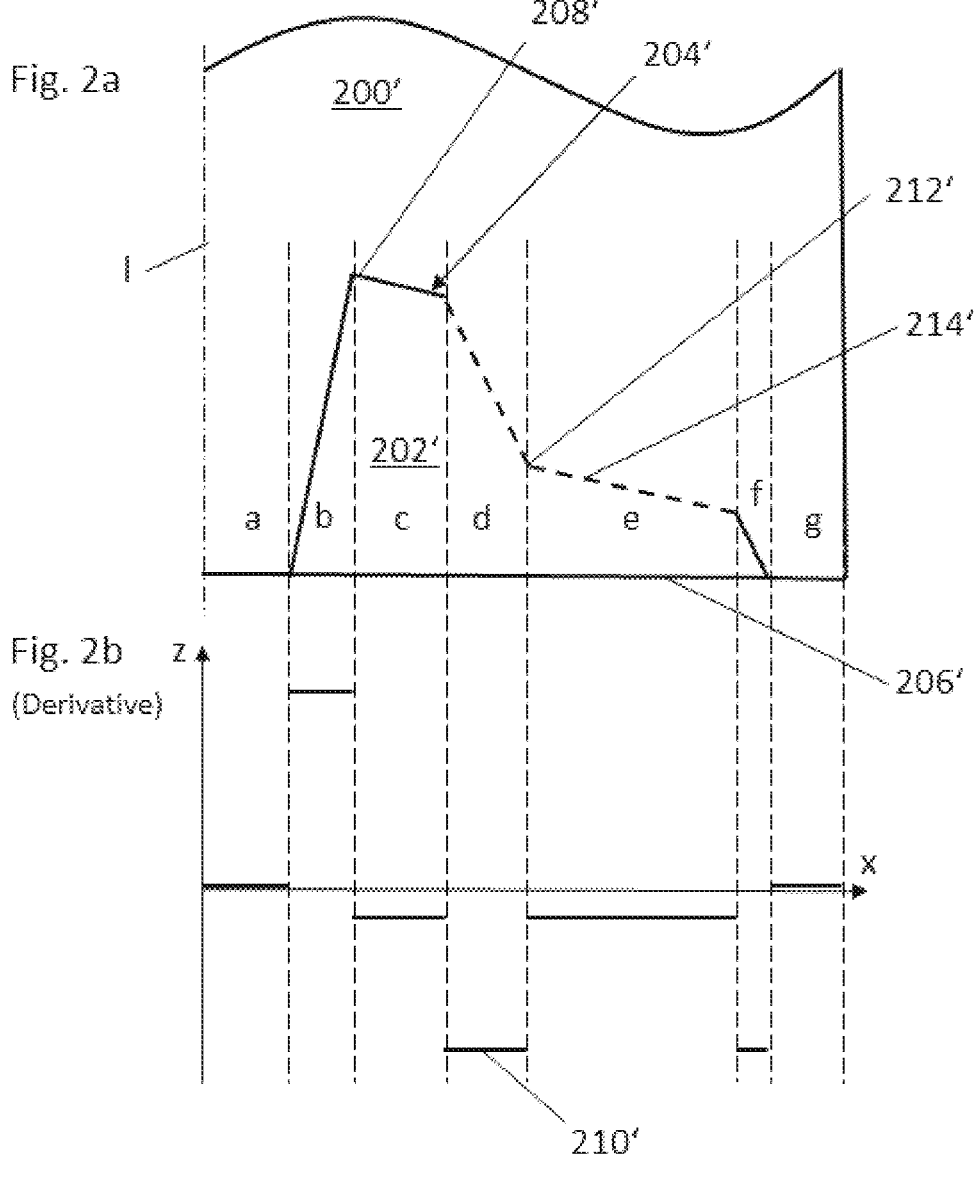

(State of the Art)

(State of the Art)

(State of the Art)

SONOTRODE, SYSTEM AND METHOD OF RESHAPING A CONNECTING ELEMENT

FIELD OF THE INVENTION

The invention relates to a sonotrode for reshaping a connecting element to form a closing head of a rivet, a system comprising the connecting element in the form of a rivet and the sonotrode, and a method of reshaping a connecting element to form a closing head.

BACKGROUND OF THE INVENTION

The method according to the invention belongs, in general, to pressure reshaping processes making use of a reshaping tool with an upsetting surface that is brought in contact with the material of the connecting element to be reshaped. The upsetting surface is herein also called contact surface. The contact surface is, more precisely, the inner surface of a cavity or die formed into the reshaping tool. During the reshaping process a force is applied and the reshaping tool and the connecting element are moved relative towards each other whereby the material of the connecting element at least partially fills the cavity. In this way the closing head recieves a positive shape corresponding to the negative shape of the cavity. The process can also be referred to as upsetting in an open die.

The method further makes use of ultrasonic vibration in order to at least partially heat the connecting element, thereby locally softening or melting the material of the connecting element before and/or while the force is applied to the reshaping tool to execute the reshaping process as described above. The ultrasonic vibration is applied via the reshaping tool itself which, therefore, is also called a sonotrode. More precisely a vibration between about 15 kHz and about 10 GHz is applied to the workpiece.

FIGS. 10a to 10c diagrammatically show a sequence of three method steps applied in a known reshaping or riveting method. The known method is used to join two materials or two elements 100, 102 together. A connecting element or rivet 104 being formed by a cylindrical solid post and consisting of a plastic is either integrally formed with the first element 100 or connected thereto. The connecting element 104 is passed through an opening arranged in the second element 102. As can be seen from FIGS. 10a to 10c a sonotrode 106 having a dome-shaped cavity 108 providing a contact surface 110 is moved in a direction towards the connecting element 104. Thereby, initially the edge between an end face 112 and an outer circumferential surface 114 of the connecting element 104 comes into contact with the contact surface 110 of the sonotrode 106.

Via the contact of the sonotrode 106 with the connecting element 104 an ultrasonic vibration is transmitted into the connecting element 104. The ultrasonic vibration is absorbed in the plastic material thereof, whereby the proportion of the absorbed ultrasonic energy depends on the damping constant or the absorption coefficient of the material. In general, the greatest amplitude of vibration within the material is reached next to the contact surface 110. The absorption effect results in heating of the connecting element 104, whereby the plastic material begins to melt in the initial contact area around the edges. As shown in FIGS. 10b and 10c, upon further moving the sonotrode 106 and the connecting element 104 relative towards each other the material is reshaped to form a closing head 116.

With some materials the introduction of heat by the ultrasonic vibration is limited to a close region in the proximity of the contact surface 110. That is due on the one hand to the absorption which generally falls exponentially with the spacing relative to the contact area. On the other hand, those materials exhibit only a low level of thermal conductivity so that the heating effect firstly remains restricted substantially to a portion in the immediate proximity of the sonotrode contacting the material. If now in addition the connecting element 104 to be reshaped comprises a material which has a heavily temperature-dependent absorption coefficient such that the absorption coefficient becomes greater with temperature, absorption in the region directly in the proximity of the contact area is still further increased by the local heating effect, which results in even more greatly localized heating. In the known method for some materials therefore it is only possible for a region in the immediate proximity relative to the sonotrode contacting the material to be adequately heated, so that it is also only in those regions that effective reshaping take place.

As can be seen in particular in FIG. 10c the closing head 116 produced by known ultrasonic reforming techniques has cylindrical constriction recesses 118 and very large regions which are actually not homogeneously connected to the remaining cylindrical post of the connecting element 104, but are only placed around the cylinder. Those regions reduce the stability of the closing head 116. In practice therefore the closing heads produced in that way have to be of larger dimensions than would actually be necessary in consideration of their geometry.

Also known are methods in accordance with FIGS. 11a to 11c, wherein two materials or two elements 120, 122 are joined together utilizing a connecting element or rivet 124 being formed by a cylindrical hollow or partially hollow post consisting of a plastic. The connecting element 124 in this case can also be described as being formed by tubular cylindrical wall 125 being either integrally formed with the first element 120 or connected thereto. The connecting element 124 is likewise passed through an opening arranged in the second element 122. A sonotrode 126 having a ring-shaped cavity 128 providing a contact surface 130 is moved in a direction towards the connecting element 124. Thereby, initially the edges between an end face 132 and an inner circumferential surface 134 of the connecting element 124 come into contact with the contact surface 130 of the sonotrode 126. The result of the reshaping according to this method is also shown in a partially cut away perspective view in FIG. 12.

As can be seen in particular in FIGS. 11c and 12 the closing head 136 produced in that way has a half torus stake head design. This design requires less material to be reformed than a solid post as shown in FIGS. 10a to 10c. Therefore, the process of reforming according to FIGS. 11a to 11c requires less energy. However, the problems described with regard to FIGS. 10a to 10c basically remain the same. Typically, as the hollow post 124 is contacted first at the edge formed at the inner circumferential surface 134, plastic molded flows from there both into and outside of the hollow post. While the post itself remains relatively cold during reforming the closing head 136 produced also here exhibits cylindrical constriction recesses 138 and large regions which are not homogeneously connected to the remaining cylindrical post of the connecting element 124. In this case the effect can even be worse, as hot melt initially flows along the contact surface 130 of the cavity 128 and away from the outer circumferential surface of the post as is illustrated in FIG. 11b.

Patent application US 2020/0130724 A1 relates to a forming process in which a plastic plug for sealing a steering housing is formed by means of ultrasound in such a way that it is held securely against rotation in a housing opening into which it has previously been screwed. A forming tool has four arms arranged on a circular circumference, each of which has a contour which is lowered axially onto a protruding hollow-cylindrical section of the plug, on whose outer circumference the thread is located. Thereby the plastic material of the plug is softened and formed complementary to the contour of the tool. Four male lugs are formed this way along the circumference, which engage in corresponding pockets in the wall of the steering housing and form an anti-rotation lock.

SUMMARY OF THE INVENTION

Based on the described state of the art, the object of the present invention is to provide a sonotrode, a system and a method for reshaping a connecting element, which particularly when reshaping materials with a heavily temperature-dependent damping constant, avoids the above-mentioned disadvantages.

The object according to a first aspect of the invention is solved by a sonotrode for reshaping a connecting element to form a closing head of a rivet comprising:

a cavity at least partially having the negative shape of the closing head to be formed;

wherein the cavity provides a contact surface designed to come in contact with the connecting element during reshaping;

wherein the sonotrode defines a longitudinal axis (l); and wherein the contact surface in a cross section in at least one first plane parallel to the longitudinal axis (l) comprises a first contour with a convex shaped outer section, so that a line connecting two points within the convex shaped outer section extends through the sonotrode and not through the cavity.

The sonotrode for reshaping a connecting element to form a closing head of a rivet comprises a cavity at least partially having the negative shape of the closing head to be formed, wherein the cavity provides a contact surface designed to come in contact with the connecting element during reshaping, wherein the sonotrode defines a longitudinal axis along which the sonotrode and the connecting element are movable relative to each other, and wherein the contact surface in a cross section in at least one first plane parallel to the longitudinal axis comprises a first contour with a convex shaped outer section, so that a line connecting two points within the convex shaped outer section extends through the sonotrode and not through the cavity.

The convex shaped outer section of the contour might be angled or curved. In other words the contact surface can be described as comprising an angled or curved melt-creating outer surface. "Outer section" and "outer surface" here means that the normal of the contact surface or its contour which points out of the sonotrode into the cavity has a component which points towards the longitudinal axis and not away.

For a better understanding, the geometry of the sonotrode can be parametrized as follows: In the at least one first plane, the direction parallel to the longitudinal axis, when pointing into the cavity, defines a z-axis or "ordinate" and the direction perpendicular to and pointing away from the z-axis defines an x-axis or "abscissa" of a two-dimensional orthogonal coordinate system. In these coordinates, preferably, said first contour along the convex shaped outer section, as a function of the distance to the z-axis, comprises a derivative which steadily or abruptly increases.

In this coordinate system the beneficial geometry of the contact surface provides a first portion at the beginning of the convex shaped outer section located close to and nearly parallel with or at an acute angle to the outer circumferential surface of the initial post, for example allowing a few degrees draft for easy release. At the same time the contact surface according to the invention provides a second portion at the end of the convex shaped outer section located nearly parallel with or at an acute angle to the surface of the element to be joined. Between the first portion and the second portion there is an inflection point or edge in the outer section of the first contour, which allows melt to flow without additional contact with the sonotrode during some span of the reshaping process. In contrast, the half-torus or dome-shape designs known in the art have no inflection point and no edge in the cross-sectional curvature and therefore the melt follows the tool contour.

A primary time limit of plastic staking is the heating of the plastic. Changing the shape of the sonotrode and accordingly of the rivet head as tought by the invention facilitates faster staking by directing the melt away from the sonotrode and towards the post as explained above. In addition, cooling of the closing head after reshaping is accelerated since the sonotrode geometry allows to produce closing heads with increased surface-to-volume ratio ("thin features") compared to known stake head designs. Thin features in case of a hollow post herein means geometric features, which have a thickness similar to the wall thickness of the post. Thus, the sonotrode according to the invention compared to known designs allows similar joining results in less time and with a lower energy cost.

In summary, the new design features of the sonotrode hereby contribute to at least one of the following effects to accelerate and improve the reshaping process so as to solve the above-mentioned object:

1. direct created melt towards the connecting element so it stays close to the outer circumferential surface thereof and assists subsequent melting by pre-heating and thus raises the ultrasonic heat dissipation increasing the damping of the material, which accelerates ultrasonic heating and strengthens the bond between the closing head and the remaining post ("melt acceleration"), 2. direct created melt away from the sonotrode so it gives less of its thermal energy to the sonotrode, and therefore does not need as much or any reheating throughout the rest of the staking process, 3. reduce the amount of plastic which must be melted to form the rivet head while providing a sufficiently large closing head diameter for a secure fixation of the elements to be joined and 4. accelerate cooling of the closing head after reshaping ("cooling acceleration").

These effects are particularly achieved according to a preferred embodiment, wherein said first contour at the beginning of the convex shaped outer section has a derivative of at most −1.2, corresponding to a tangent angle of 0° to 40° relative to the negative z-axis, preferably of at most −1.6, corresponding to a tangent angle of 0° to ca. 32°, and more preferably of at most −2.3, corresponding to a tangent angle of 0° to 23.5°.

In addition, the first contour at the end of the convex shaped outer section preferably has a derivative of at least −0.7 corresponding to a tangent angle of at least ca. 55° relative to the negative z-axis, more preferably of at least −0.58 corresponding to a tangent angle of at least ca. 60° and even more preferably of at least −0.47 corresponding to a tangent angle of at least ca. 65°.

According to an advantageous embodiment the contact surface in two or more cross sections in two or more different first planes parallel to the longitudinal axis comprises said first contour with a convex shaped outer section; wherein an indentation is formed between each two of said two or more first planes, wherein the contact surface in a cross section in an intermediate plane between each two of said two or more first planes comprises a second contour, the second contour with regard to the first contour, in particular with regard to the convex shaped outer sections, extends outwardly in direction of the x-axis of the intermediate plane. In the intermediate plane the direction parallel to the longitudinal axis (l), when pointing into the cavity, likewise defines the z-axis (ordinate) and the direction perpendicular to and pointing away from the z-axis likewise defines the x-axis (abscissa) of a two-dimensional orthogonal coordinate system.

The indentations formed as a portion of the cavity serve to form complementary ribs extending outwardly from the core of the closing head. In other words, sonotrodes in accordance with this embodiment are designed to produce closing heads with a circumferentially uneven structure, wherein the ribs serve to reinforce the overall head design while between the ribs sufficiently thin features remain in order to decrease the cooling time.

The indentation preferably extends in a first direction away from the longitudinal axis and in a second direction parallel to the longitudinal axis.

While the design of the cavity discussed herein so far is not limited to a particular base geometry, i.e. a crossection in the base plane perpendicular to the longitudinal axis, according to another embodiment the cavity with regard to the longitudinal axis has a rotational symmetry of order n≥2 or a cylindrical or circular symmetry. In case of a rotational symmetry of order n≥2, according to a preferred embodiment n≥2 different first planes lie in n≥2 discontinuous angular sections around the longitudinal axis and an indentation is formed between each two adjacent angular sections.

In a preferred embodiment the contour along the x-axis first comprises an apex and then said convex shaped outer section. This represents both the dome-shaped cavity where the longitudinal axis extends through the apex and the ring-shaped cavity where the apex is located at a distance to the longitudinal axis.

In a particularly preferred embodiment of the sonotrode for reshaping a connecting element to form a closing head of a rivet, wherein the connecting element definies a longitudinal axis and is at least partially formed by either a tubular wall or a solid post with an outer circumferential surface and an end face, the sonotrode comprises a cavity at least partially having the negative shape of the closing head to be formed, wherein the cavity provides a contact surface designed to come in contact with the connecting element during reshaping wherein the sonotrode defines a longitudinal axis (l) being alignable with the longitudinal axis of the connecting element, wherein in at least one first plane parallel to the longitudinal axis (l), the direction parallel to the longitudinal axis (l), when pointing into the cavity, defines a z-axis and the direction perpendicular to and pointing away from the z-axis defines an x-axis of a two-dimensional orthogonal coordinate system, wherein the contact surface in a cross section in the at least one first plane parallel to the longitudinal axis (l) comprises a first contour, along the x-axis first comprising an apex and then a convex shaped outer section, so that a line connecting two points within the convex shaped outer section extends through the sonotrode and not through the cavity, and wherein the first contour comprises an apex portion surrounding the apex and being arranged to initially get in contact with the connecting element at the end face thereof or, preferably, in a transition section between the outer circumferential surface and the end face, when the sonotrode and the connecting element are moved relative towards each other.

In another particularly preferred embodiment of the sonotrode for reshaping a connecting element to form a closing head of a rivet, wherein the connecting element defines a longitudinal axis and is at least partially formed by either a tubular wall or a solid post with an outer circumferential surface and an end face, the sonotrode comprising a cavity at least partially having the negative shape of the closing head to be formed. wherein the cavity provides a contact surface designed to come in contact with the connecting element during reshaping, wherein the sonotrode defines a longitudinal axis (l) being alignable with the longitudinal axis of the connecting element, wherein in at least one first plane parallel to the longitudinal axis (l), the direction parallel to the longitudinal axis (l), when pointing into the cavity, defines a z-axis and the direction perpendicular to and pointing away from the z-axis defines an x-axis of a two-dimensional orthogonal coordinate system, wherein the contact surface in a cross section in the at least one first plane parallel to the longitudinal axis (l) comprises a first contour, along the x-axis first comprising an apex and then a convex shaped outer section, so that a line connecting two points within the convex shaped outer section extends through the sonotrode and not through the cavity, and wherein the first contour comprises an apex portion surrounding the apex and being arranged, upon initial contact between the sonotrode and the connecting element, to face the end face of the connecting element, and wherein the convex shaped outer section, upon initial contact, faces at least a part of the outer circumferential surface of the connecting element.

The object according to a second aspect of the invention is solved by a system comprising a connecting element in the form of a rivet and a sonotrode as described in the claims, the connecting element defining a longitudinal axis being aligned with the longitudinal axis of the sonotrode and being at least partially formed by either a tubular wall or a solid post with an outer circumferential surface and an end face; wherein the sonotrode and the connecting element are arranged to be movable along the longitudinal axis relative to each other; and wherein the first contour comprises an apex portion surrounding the apex and being arranged to initially get in contact with the connecting element at the end face thereof or, preferably, in a transition section between the outer circumferential surface and the end face, when the sonotrode and the connecting element are moved relative towards each other.

The system comprises a connecting element in the form of a rivet and a sonotrode according to the first aspect of the invention described herein above. The connecting element defines a longitudinal axis being aligned with the longitudinal axis of the sonotrode. The connecting element is at least partially formed by either a tubular wall or a solid post with an outer circumferential surface and an end face. The sonotrode and the connecting element are arranged to be movable along the longitudinal axis relatively to each other. The contour comprises an apex portion surrounding the apex and being arranged to initially get in contact with the connecting element at the end face thereof or, preferably, in a transition section between the outer circumferential surface and the end face, when the sonotrode and the connecting element are moved relative towards each other.

Other than in the known systems utilizing a hollow post, see FIGS. 11a to 11c, the contact surface does not initially contact the post in proximity to the inner circumferential surface but to the outer circumferential surface. In addition to the above-mentioned effects initiating the melting on the outer diameter ensures a shorter path for melt to flow.

Another preferred embodiment of the system comprises a connecting element in the form of a rivet and a sonotrode according to the first aspect of the invention described herein above. The connecting element defines a longitudinal axis being aligned with the longitudinal axis of the sonotrode. The connecting element is at least partially formed by either a tubular wall or a solid post with an outer circumferential surface and an end face. The sonotrode and the connecting element are arranged to be movable along the longitudinal axis relative to each other. The first contour comprises an apex portion, the apex portion surrounding the apex and being arranged, upon initial contact between the sonotrode and the connecting element, to face the end face of the connecting element, and wherein the convex shaped outer section, upon initial contact between the sonotrode and the connecting element, faces at least a part of the outer circumferential surface of the connecting element, wherein, when the sonotrode and the connecting element are moved from the initial contact further relative towards each other in a direction along the longitudinal axis over a stroke (s), the convex shaped outer section is formed to direct melt to flow along and in permanent contact to the outer circumferential surface of the connecting element over the at least initial 15%, preferably 25% and more preferably 40%, of said stroke.

According to yet another preferred embodiment of the system comprising a connecting element in the form of a rivet and a sonotrode according to the first aspect of the invention described herein above, the connecting element defines a longitudinal axis being aligned with the longitudinal axis of the sonotrode. The connecting element is at least partially formed by either a tubular wall or a solid post with an outer circumferential surface and an end face, the tubular wall at the end face having a wall thickness t or the solid post at the end face having a minimum width w, wherein for more than 50% of points in the cavity, preferably for more than 70% of the points in the cavity, either 1) the width of the cavity along the x-axis, through the respective point is less than two times the wall thickness t or less than half of the minimum width w,
or
   2) the height of the cavity along the longitudinal axis through the respective point is less than the wall thickness t or less than a fourth of the minimum width w.

The connecting element herein is a three-dimensional element which can be defined by a base surface as a boundary, the circumferential surface and the endface, e.g. a general cylinder in the mathematical sense. The circumferential surface essentially extends in the direction of the longitudinal axis. It can have, e.g. a circular base and endface, a rectangular (including a squared) base and endface, an elliptical base and endface, an oval base and endface or a base and endface having a more complex shape. In every case the "minimum width w" of the solid post is equal to the width (as opposed to the length) of the smallest possible rectangle enveloping the endface. In case of a circular cylinder, for example, the minimum width is its diameter. In case of a rectangular cylinder it is its width.

In addition, the invention is also applicable to connecting elements with circumferential surfaces being slightly inclined with respect to the longitunial axis, i.e. for example to posts with non-parallel walls, such as truncated cones or posts with trapezoidal cross sections. The angle of inclination is preferably less than or equal to 10° and serves to facilitate demolding. In the case of hollow posts, the inclination can occur along the inner circumferential surface or along the outer circumferential surface or both and thus might lead to a varying wall thicknesses in the longitudinal direction. In all these cases with inclined circumferential surfaces with respect to the longitudinal direction, the inclination does not alter the above definition. The "minimum width" also in these cases is equal to the width of the smallest possible rectangle enveloping the end face.

Preferably in any of the above-described systems the connecting element consists of PP, ABS, ABS/PC, TPO, PA, PET and PEEK, optionally including fibers or particles being dispersed therein. For example, the fibers therein are used for reinforcement. These fibers are preferably relatively short compared to the dimensions of the connecting element. In a preferred embodiment they are not longer than 10% of the length (extension in longitudinal direction) of the connecting element. As a consequence, they do not have a preferred orientation and provide reinforcement in all directions of the connecting element.

As mentioned herein before "thin features" mean geometric features, which have a thickness similar to the wall thickness of the original post. That is, the thin features are realized in that for most points in the stake head volume, either 1) a "horizontal line" in the direction of the x-axis coincident with the point can be drawn, wherein the distance between the two intersection points of the horizontal line and the surface shared by the stake and sonotrode is less than 2 times the wall thickness t (in case of a cylindrical hollow post: outer post radius minus inner post radius) or half of the minimum width w, or 2) a "vertical line" in the direction of the z-axis coincident with the point can be drawn, wherein the distance between the intersection point of the vertical line and the surface shared by the stake and sonotrode is less than the wall thickness t or a fourth of the minimum width w.

Accordingly, in case an indentation is formed between each two of said two or more first planes, the thin feature requirement also applies here. For an indentation extending in a first direction away from the longitudinal axis and in a second direction parallel to the longitunal axis as defined above, the following dimension is preferred: In case of the connecting element being at least partially formed by a tubular wall having a wall thickness t, preferrably, the indentation has a thickness in a third direction perpendicular to the plane spanned by the first direction and the second direction of less than or equal to 2t. In case of the connecting element being at least partially formed by a solid post having a minimum width w, preferrably, the indentation has a thickness in a third direction perpendicular to the plane spanned by the first direction and the second direction of less than or equal to w/2, more preferably between w/2 and w/4.

The object according to a third aspect of the invention is solved by a method of reshaping a connecting element to form a closing head wherein the melt after flowing along and in contact to the outer circumferential surface of the connecting element is deflected to flow in a direction away from the outer circumferential surface of the connecting element. The method comprises the steps: providing a connecting element in the form of a rivet, the connecting element defining a longitudinal axis and being at least partially formed by either a tubular wall or a solid post with an outer circumferential surface and an end face; providing a sonotrode aligned with the longitudinal axis, the sonotrode having a cavity and preferably being a sonotrode according to the first aspect of the invention, the cavity at least partially having the negative shape of the closing head to be formed, wherein the cavity provides a contact surface designed to come in contact with the connecting element during reshaping; initially bringing the contact surface of the sonotrode in contact with the connecting element at the end face or in a transition section between the outer circumferential surface and the end face; applying an ultrasonic vibration via said sonotrode to the connecting element thereby initially softening or melting the material of the connecting element at the end face or in the transition section between the outer circumferential surface and the end face; after bringing the contact surface of the sonotrode in contact with the connecting element, moving said sonotrode and the connecting element relative towards each other over a stroke s in a direction along the longitudinal axis, thereby direct softened material or melt to flow along and in permanent contact to the outer circumferential surface of the connecting element over at least 15%, preferably 25% and more preferably 40%, of said stroke s.

According to a preferred embodiment of the method, the melt after flowing along and in contact to the outer circumferential surface of the connecting element is deflected to flow in a direction away from the outer circumferential surface of the connecting element. "A direction away from the outer circumferential surface" means that the melt flows in a direction of the normal on the outer circumferential surface of the connecting element or at an acute angle to it.

BRIEF DESCRIPTION OF THE DRAWINGS

Further advantages, features and effects are described below with reference to the drawings. Therein:

FIG. 2a illustrates another embodiment of a sonotrode in accordance with the invention in a half cross sectional view;

FIG. 2b illustrates the derivative of the contour line of the sonotrode according to FIG. 2A as a function of its distance to the longitunal axis;

DETAILED DESCRIPTION OF THE INVENTION

Figures 1A, 1B:
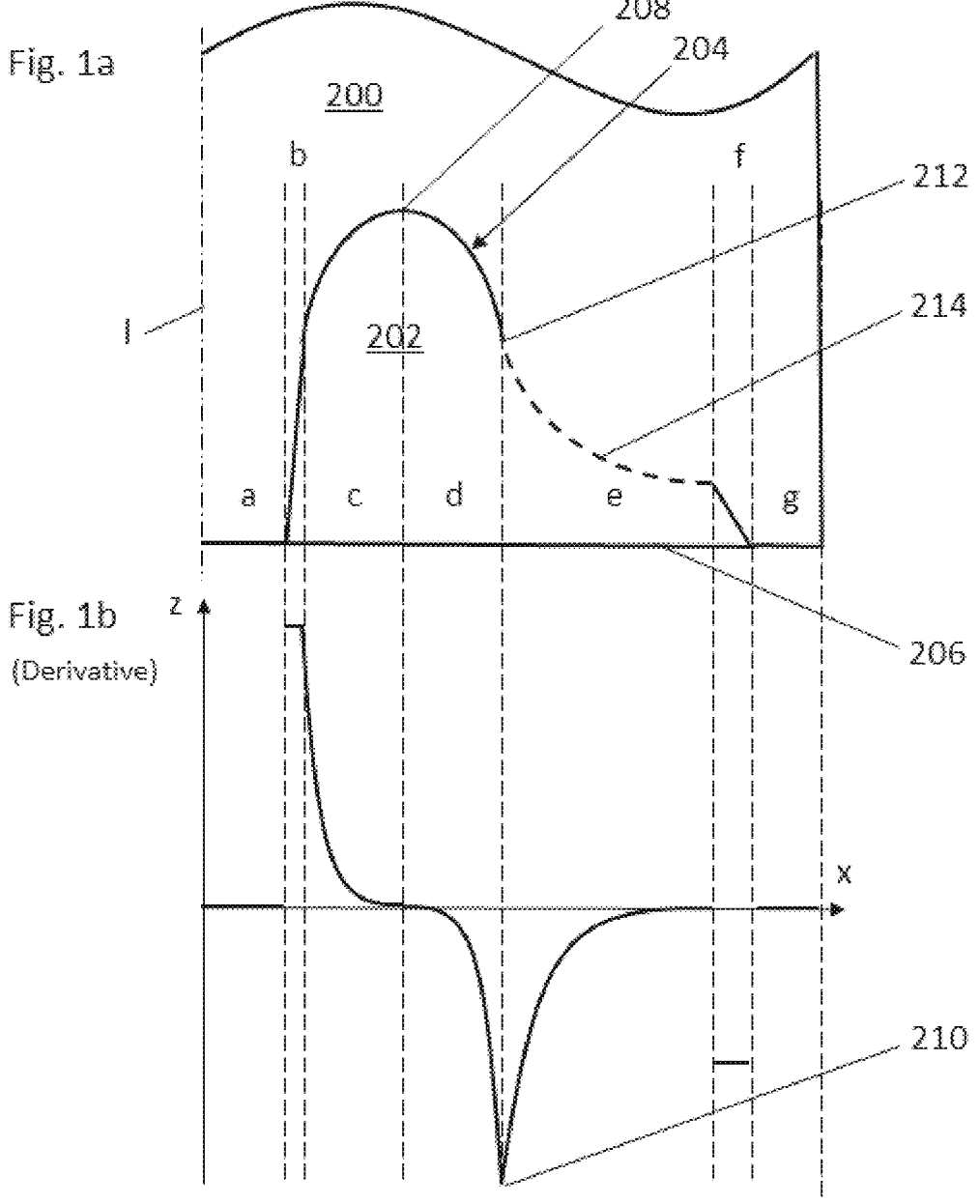
FIG. 1a illustrates an embodiment of the sonotrode in accordance with the invention in a half cross sectional view.
FIG. 1b illustrates the derivative of the contour line of the sonotrode according to FIG. 1A as a function of the distance to its longitunal axis.

FIG. 1a shows a cross section through a first embodiment of a sonotrode 200. The cross section lies in a plane parallel to a longitudinal axis l of the sonotrode 200. The sonotrode 200 according to this embodiment has a rotational symmetry around the longitudinal axis l. Thus, the cross section is shown only half.

The sonotrode 200 comprises a cavity 202 at least partially providing a contact surface 204 designed to come in contact with the connecting element (not shown) during reshaping. The contact surface in the cross section is represented by a contour.

A coordinate system is defined wherein the longitudinal axis l when pointing into the cavity 202 defines a z-axis and the direction perpendicular to and pointing away from the z-axis defines the positive x-axis of a two-dimensional orthogonal coordinate system lying within the plane of the cross section. The x-axis also lies in a base plane 206 of the sonotrode.

FIG. 1b illustrades the derivative or gradient of the contour in the x-z-coordinate system.

The sonotrode 200 is designed to reshape a connecting element in form of a hollow post and to form a ring-shaped rivet head. Auxiliary dashed lines in FIGS. 1a and 1b indicate sections along the x-axis of the contour of the contact surface 204 within the cross section. Section a is a center portion of the sonotrode without cavity. The surface of the sonotrode in the center portion lies in the base plane 206 and comes in contact with the element to be joined when the sonotrode and the connecting element are moved towards each other along the longitudinal axis l over a full stroke. In section b the contact surface extends from the base plane 206 into the sonotrode 200 at a maximum derivative. In section c the derivative continuosly decreases to 0. Accordingly, at this location the contour has an apex 208 and sections d is the beginning of the outer section of the contact surface 204. In section d the derivative further continuosly decreases up to a minimum value at 210. In section e the derivative increases again. That means that the contour at the transition from section d to section e has an inflection point 212. Further, in section e the contour of the sonotrode 200 has a convex shape. i.e. a line connecting two points within the convex shaped outer section 214 extends through the sonotrode 200 and not through the cavity 202. The convex shaped outer section 214 in FIG. 1a is illustrated as a dashed curve. Radially outwardly at the transition from section e to section f the derivative of the contour abruptly decreases. Within section f the derivative is constant until at the transition from section f to section g the contour of the contact surface 204 ends at the base plane 206 again.

FIGS. 2a and 2b similarly show a cross section through a second embodiment of a sonotrode 200' and the derivative or gradient of the contour in the x-z-coordinate system.

The sonotrode 200' with its cavity 202' is also designed to reshape a connecting element in form of a hollow post and to form a ring-shaped rivet head. One difference compared to the first embodiment is that the contour of the contact surface 204' at all transitions between sections a to g is unsteady. Section a again is a center portion of the sonotrode without cavity with the surface of the sonotrode in the center portion lying in the base plane 206'. In section b the contact surface 204' extends from the base plane 206' into the sonotrode 200' at a positive maximum derivative. In section c the derivative is constant and negative. Accordingly, at the transition between sections b and c the contour has a maximum 208' which is herein also subsumed under the term "pex". As a further consequence of the negative derivative the outer section of the conour of the contact surface 204 already begins in section c. At the transition to section d the derivative is further discontinuously decreased to a constant minimum value at 210'. In section e the derivative is abruptly increased but still negative. That again means that the contour at the transition from section d to section e has an edge 212'. Further, a convex shaped outer section 214', in which a line connecting two points within the convex shaped outer section 214' extends through the sonotrode 200' and not through the cavity 202', spans over section d and section e. The convex shaped outer section 214' is also in FIG. 2a illustrated as a dashed curve. Radially outwardly at the transition from section e to section f the derivative of the contour abruptly decreases. Within section f the derivative is constant until at the transition from section f to section g the contour of the contact surface 204' ends at the base plane 206' again.

Figures 3A, 3B, 3C:
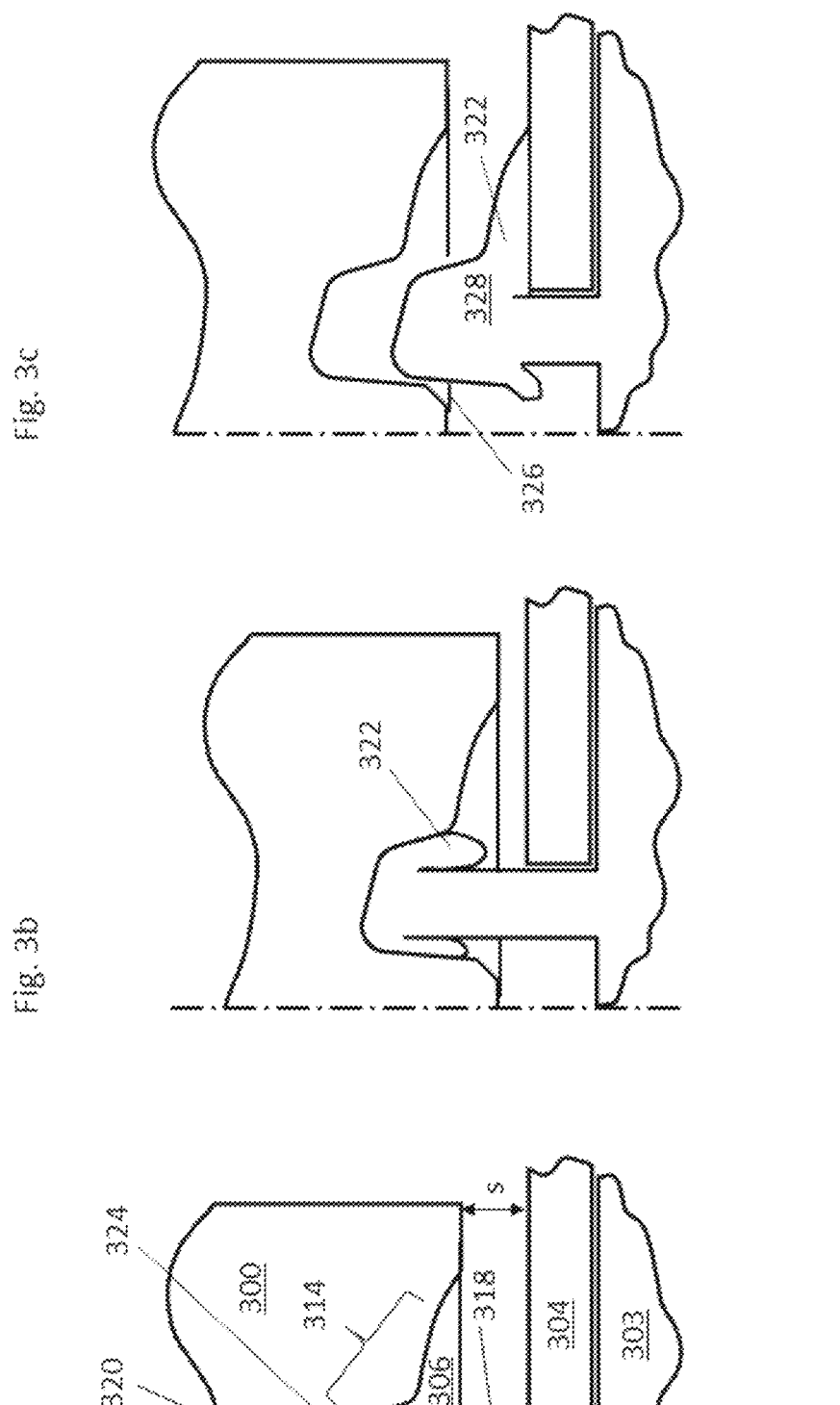
FIGS. 3a to 3c illustrate a system with a sonotrode moving relative to a connecting element over a sequence of three process steps.

In FIGS. 3a to 3c a system comprising a sonotrode 300 and a connecting element or rivet 302 is shown over a sequence of three process steps, wherein two platelike elements 303, 304 are to be joined. The connecting element 302 is integrally formed with the first platelike element 303 and passed through an opening arranged in the second platelike element 304.

More specifically, the sonotrode 300 and the connecting element or post 302 are shown again in a half cross section lying in a plane parallel to a common longitudinal axis l of the sonotrode 300 and the connecting element 302. The sonotrode 300 and the connecting element 302 according to this embodiment have a rotational symmetry around the longitudinal axis l. A coordinate system as defined herein before is also shown.

The sonotrode 300 comprises a ring-shaped cavity 306 at least partially providing a contact surface 308 designed to come in contact with the connecting element 302 during reshaping. More precisely, the contact surface 308 in the cross section shown comprises a first contour 310 with an apex 312 an apex portion 313 surrounding the apex 312 and a convex shaped outer section 314 in accordance with the invention. The connecting element 302 is formed by a cylindrical hollow or partially hollow post consisting of a plastic and comprizing a tubular cylindrical wall 316 with an outer circumferential surface 318 and an end face 320.

FIG. 3a shows the system in the moment of the initial contact, where the apex portion 313 of the contact surface 308 contacts the connecting element in a transition section between the outer circumferential surface 318 and the end face 320. As can be seen in FIG. 3b, when the sonotrode 300 after initial contact is moved further in a direction along the longitudinal axis l and towards the connecting element 302 melt 322 is immediately directed to flow along and in permanent contact to the outer circumferential surface 318 of the connecting element 302. One reason for that is, that in the initial contact point 324 the contact surface has a negative derivative. Another reason is that the contour 310 at the beginning of the convex shaped outer section 314 has a significant negative derivative, so that the outer section 314 here is located close to and nearly parallel with or at an acute angle to the outer circumferential surface 318 of the post 302. Over about the half of the stroke s in a direction along the longitudinal axis l melt is thus directed to flow along and in permanent contact to the outer circumferential surface 318 of the connecting element 302.

The result of the reshaping and particularly the resulting closing head 328 is shown in FIG. 3c. As can be seen, the melt 322 after flowing along and in contact to the outer circumferential surface 318 of the connecting element 302, for the rest of the stroke s is deflected to flow in a direction away from the outer circumferential surface 318 of the connecting element 302. namely, basically parallel to the base plane 326 or at an acute angle to it.

Figure 4:
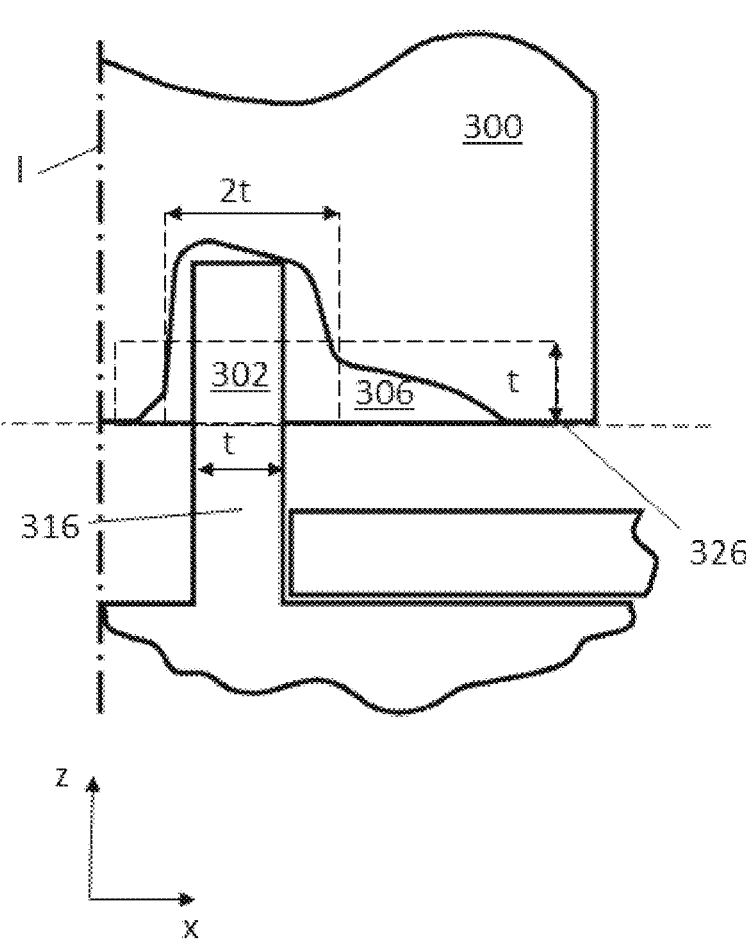
FIG. 4 illustrates the dimensions of the sonotrode according to the embodiment in FIGS. 3a to 3c in a half cross sectional view.

The dimensions of the cavity 306 of the sonotrode 300 relative to the dimension of the connecting element 302 are explained with reference to FIG. 4 showing the same cross section thereof. The tubular wall 316 of the connecting element 302 has a wall thickness t. Two vertical auxiliary dashed lines are drawn in a distance of two times the wall thickness t and one horizontal auxiliary dashed line is drawn in a distance t above the base plane 326. As can be directly seen, for every point within the cavity 306 at least one of the following conditions is fulfilled: either the width of the cavity along the x-axis, through the respective point is less than two times the wall thickness t, or the height of the cavity along the longitudinal axis l through the respective point is less than the wall thickness t. This geometry provides for the thin features of the closing head 328 having a thickness similar to the wall thickness of the post 302.

Figure 5:
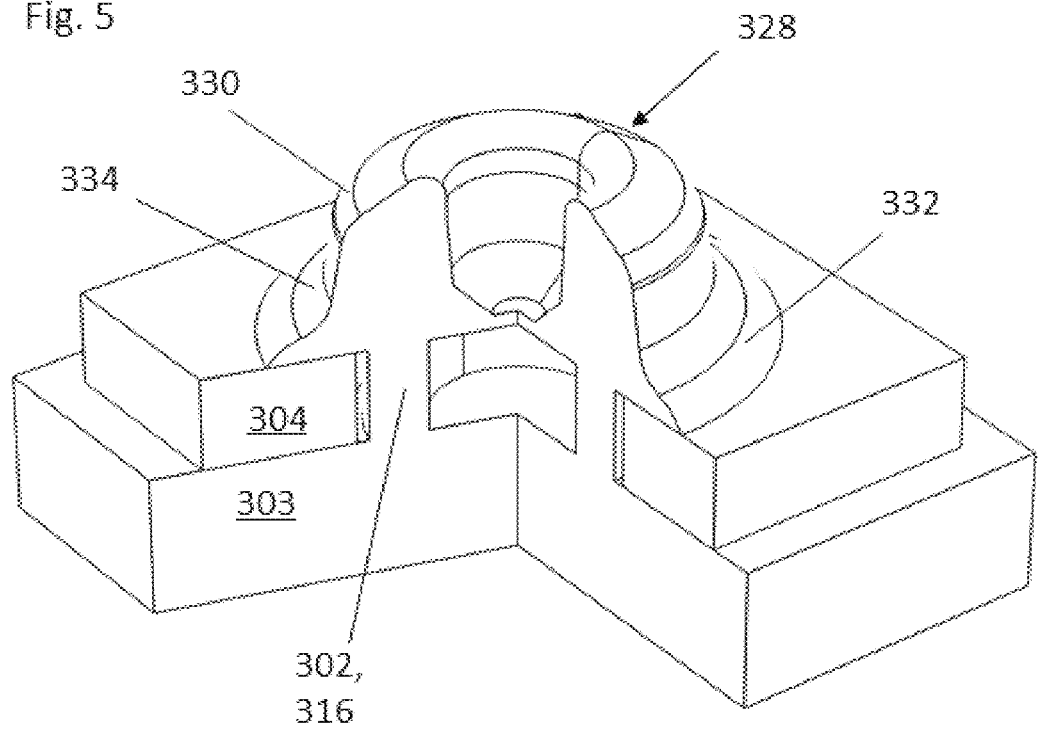
FIG. 5 shows a partially cut away perspective view of an embodiment of the closing head produced according to the invention.

FIG. 5 shows a partially cut away perspective view of an embodiment of the closing head produced with the system according to FIGS. 3 and 4. The closing head 328 has a positive shape complementary to the negative shape of the cavity 306. More precisely, the closing head 328 has a half torus stake head design with a circumferentially continuous thin upper portion 330, a circumferentially continuous thin base portion 332 and a circumferentially continuous concave section 334 in the transition region therebetween.

Figure 6:
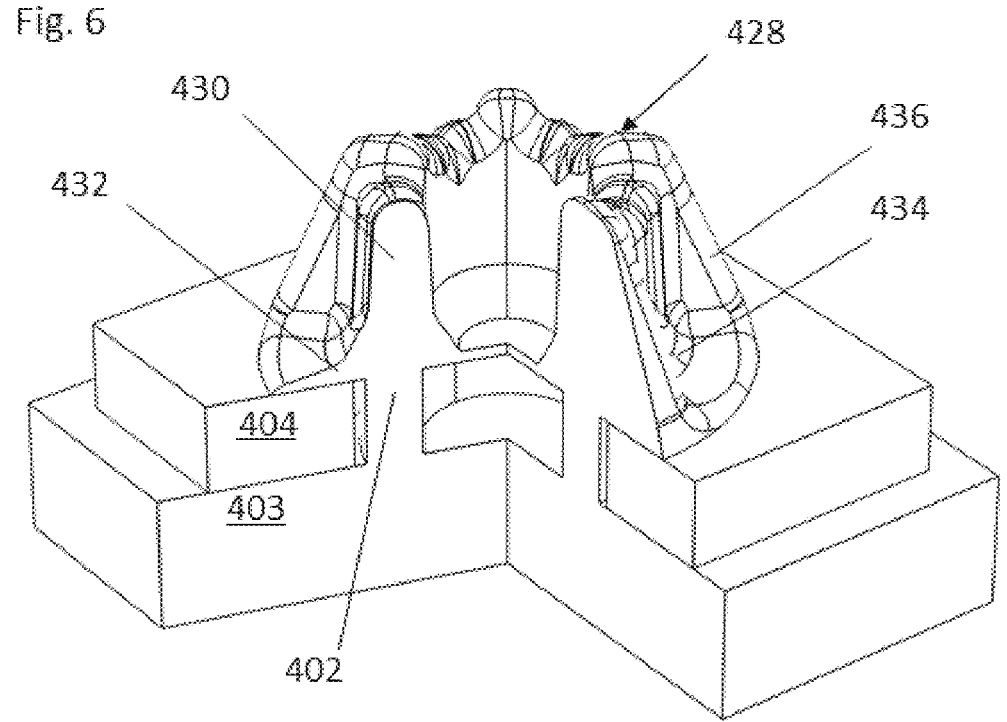
FIG. 6 shows a partially cut away perspective view of another embodiment of the closing head produced according to the invention.

FIG. 6 shows a partially cut away perspective view of another embodiment of the closing head 428 produced in accordance with the invention. A connecting element or rivet 402 is shown joining two platelike elements 403 and 404. The connecting element 402 is again integrally formed with the first platelike element 403 and passed through an opening arranged in the second platelike element 404.

According to this embodiment the sonotrode for reshaping the connecting element to form a head design as illustrated comprised a contact surface with a first contour in five cross sections in five different first planes parallel to the longitudinal axis which is similar to the one described with reference to the FIGS. 3 and 4. In these five planes the contour of the closing head 428 has a core profile with a thin upper portion 430, a thin base portion 432 and a concave section 434 in the transition region therebetween. Between each two of said five first planes, the sonotrode used to form the staking head of FIG. 6 had 5 indentions for forming complementary five ribs 436 protruding radially outwardly from core profile with regard to the longitudinal axis. More precisely, the contact surface of the sonotrode comprises a second contour in five cross sections in five intermediate radial planes spanned at equal angular distances around the longitunal axis and between each two of the 5 first planes. The second contour with regard to the convex shaped outer sections of the first contour extends radially outwardly along each intermediate plane. Thus, the cavity and the staking head with regard to the longitudinal axis have a rotational symmetry of order n=5. The ribs formed accordingly protrude at equal angular distances along the same five intermediate planes. The ribs serve to reinforce the stake head over its entire circumference. They preferably have a thickness in a third direction perpendicular to the intermediate planes in a range of t and 2t, wherein t again designates the wall thickness of the post 402.

Figure 7:
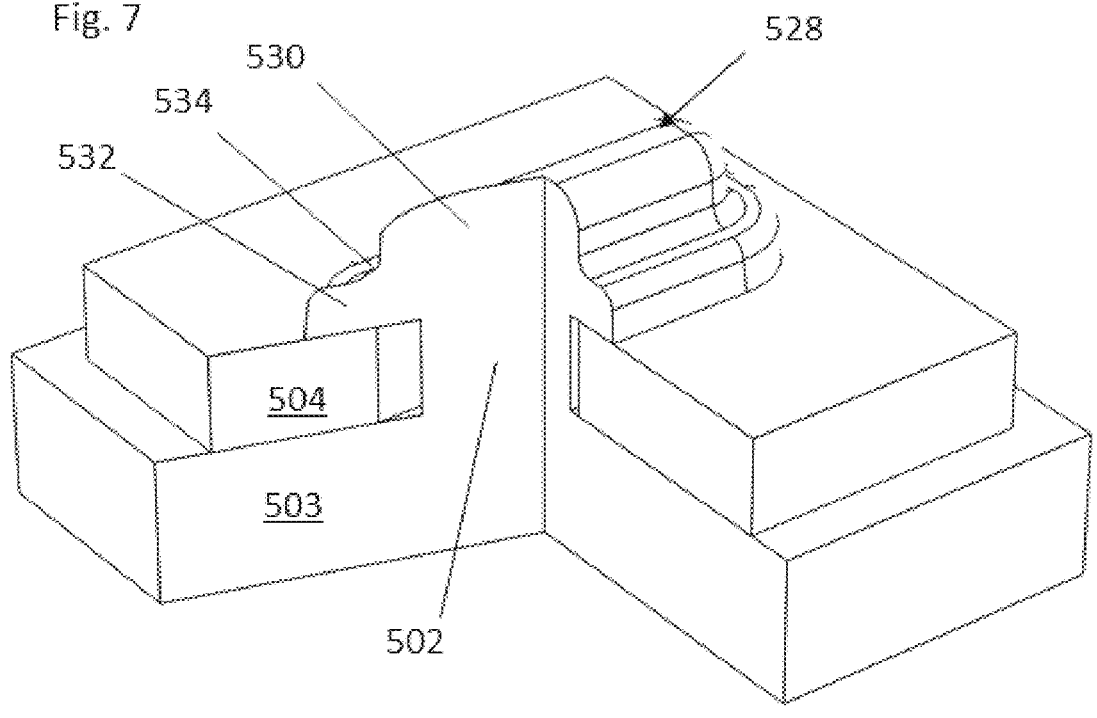
FIG. 7 shows a partially cut away perspective view of yet another embodiment of the closing head produced according to the invention.

A connecting element or rivet 502, in contrast to any other connecting elements discussed herein before having an enlongated circumference in the form of a rectangle with rounded corners, is shown in a partially cut away perspective view in FIG. 7. The connecting element or rivet 502 joins two platelike elements 503 and 504 and is again integrally formed with the first platelike element 503 while it passes through an opening arranged in the second platelike element 504. The rivet 502 in this embodiment is based on a solid post. It is formed according to a method and with a sonotrode according to the invention. In particular, a rivet head or closing 528 is formed having a dome-shaped head design with a circumferentially continuous thin upper portion 530, a circumferentially continuous thin base portion 532 and a circumferentially continuous concave section 534 in the transition region therebetween. The head does not exhibit circumferential ribs. This embodiment illustrates that the invention is not limited to methods or sonotrodes for reshaping connecting elements with a cylindrical symmetry or a rotational symmetry of order n>2 or a rotational symmetry of order n≥2 only in connection with said ribs or similar uneven structures along the circumference. Rather, the invention is not limited to any circumferential base contour.

Figure 8:
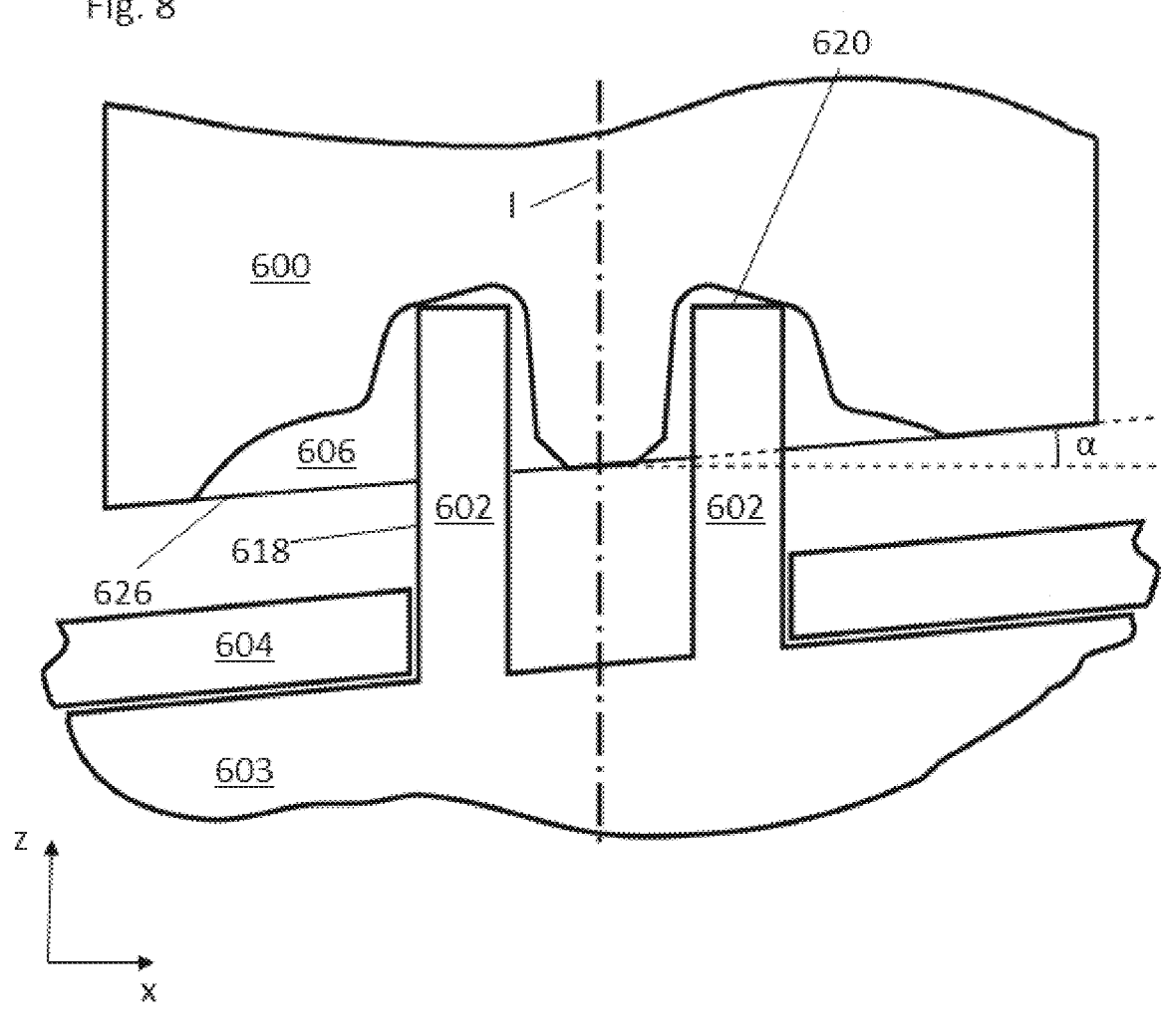
FIG. 8 illustrates another embodiment of the system in accordance with the invention in a full cross-sectional view.

In FIG. 8 another embodiment of the system according to the invention is schematically shown in a full cross-sectional view. The system comprises a sonotrode 600 and a connecting element or rivet 602 for joining two platelike elements 603, 604. The connecting element 602 is integrally formed with the first platelike element 603 and passed through an opening arranged in the second platelike element 604.

The cross section illustrated lies in a plane including the longitudinal axis 1 commonly shared by the sonotrode 600 and the connecting element 602. The sonotrode 600 comprises a ring-shaped cavity 606 which is basically identical to the cavity according to FIGS. 3 and 4. Likewise the connecting element 602 is similarly formed by a cylindrical hollow or partially hollow post consisting of a plastic and comprizing a tubular cylindrical wall with an outer circumferential surface 618 and an end face 620. The difference between these two embodiments is that the base plane 626 of the sonotrode 600 cuts the cavity under an angle≠90°, and more particularly under an angle of 90°−α, relative to the longitudinal axis 1. Therefore, the cavity 606 is deeper on the left-hand side than on the right-hand side of the drawing.

This results in the sonotrode 600 and the cavity 606 not having a cylindrical or rotational symmetrie although both the sonotrode 600 and the connecting element 602 have a circular base concentrically aligned with the longitudinal axis.

Figure 9:
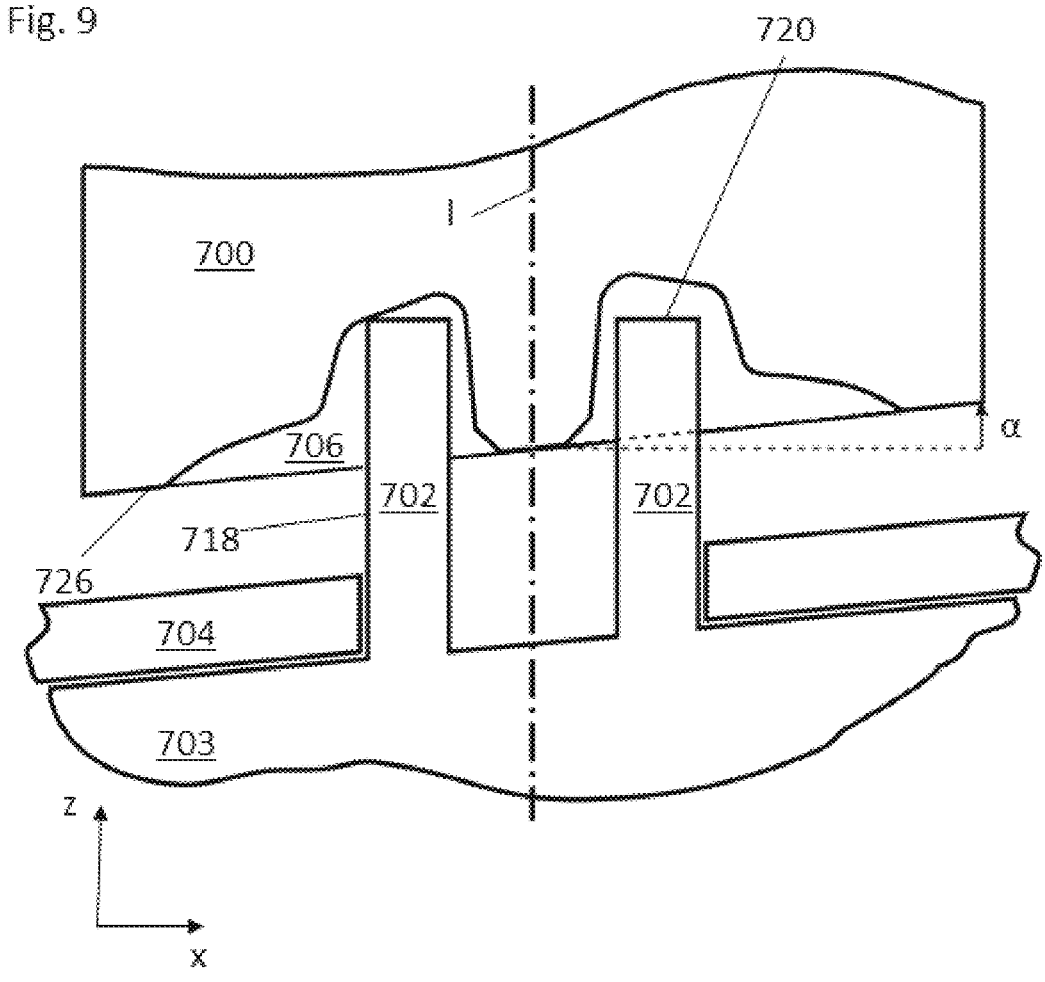
FIG. 9 illustrates yet another embodiment of the system in accordance with the invention in a full cross-sectional view.
Figures 10A, 10B, 10C:
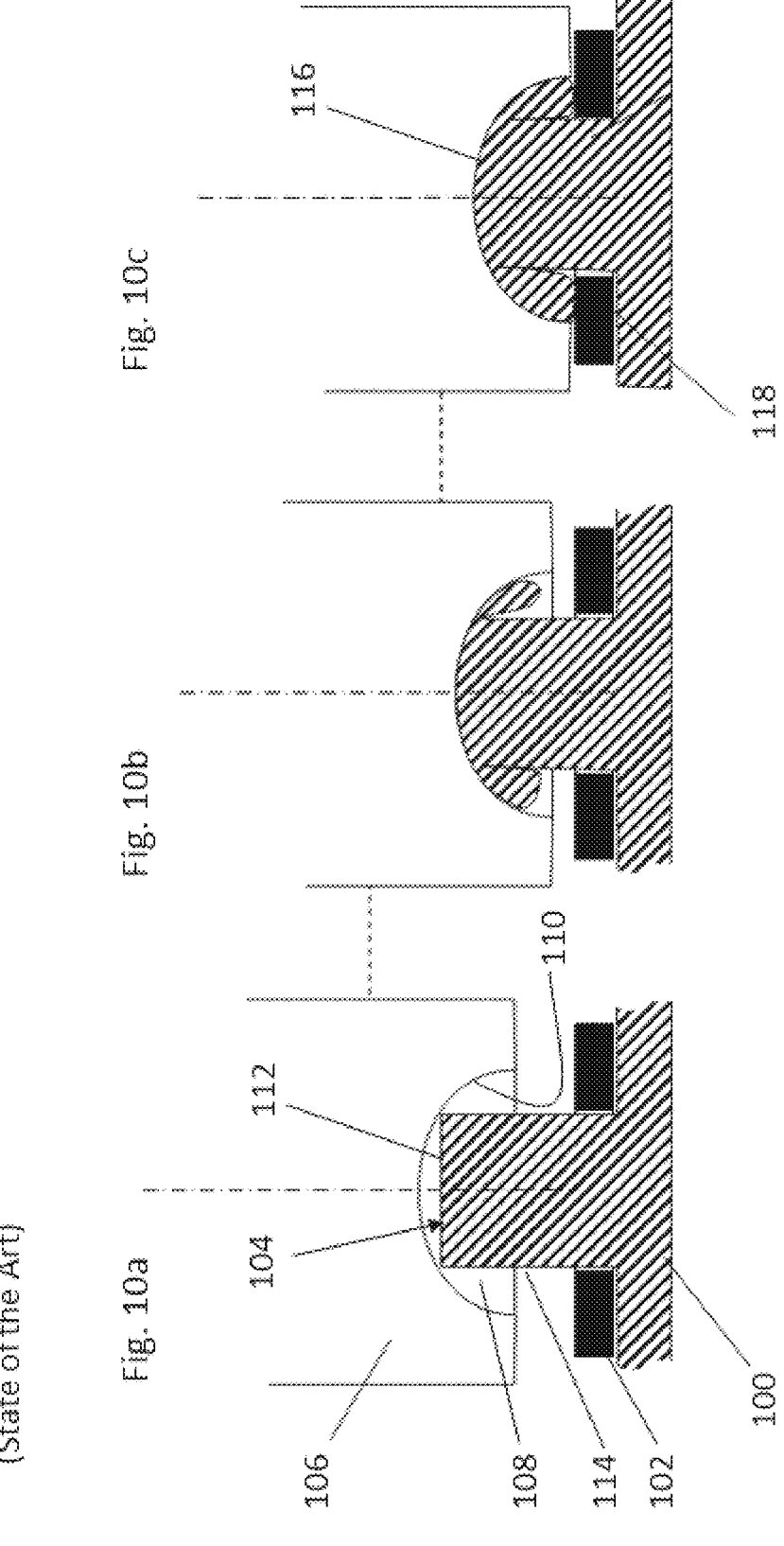
FIGS. 10a to 10c illustrate a sonotrode known in the art moving relative to a connecting element over a sequence of three process steps.
Figure 11C:
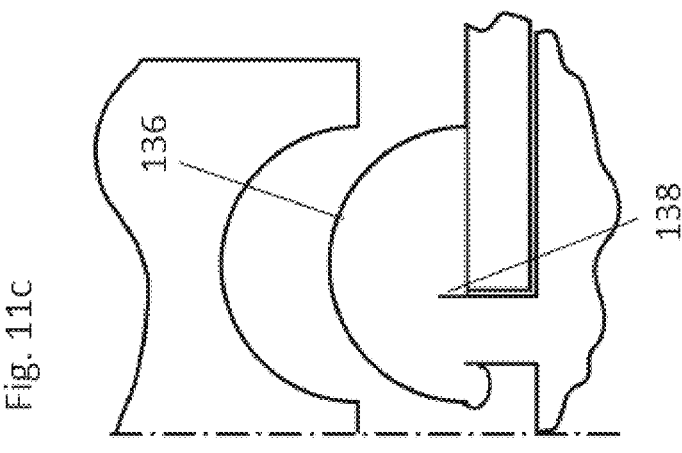
FIGS. 11a to 11c illustrate another sonotrode known in the art moving relative to a connecting element over a sequence of three process steps.
Figure 11B:
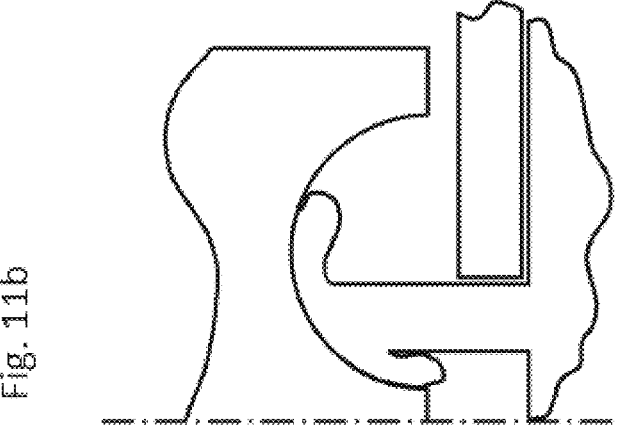
Figure 11A:
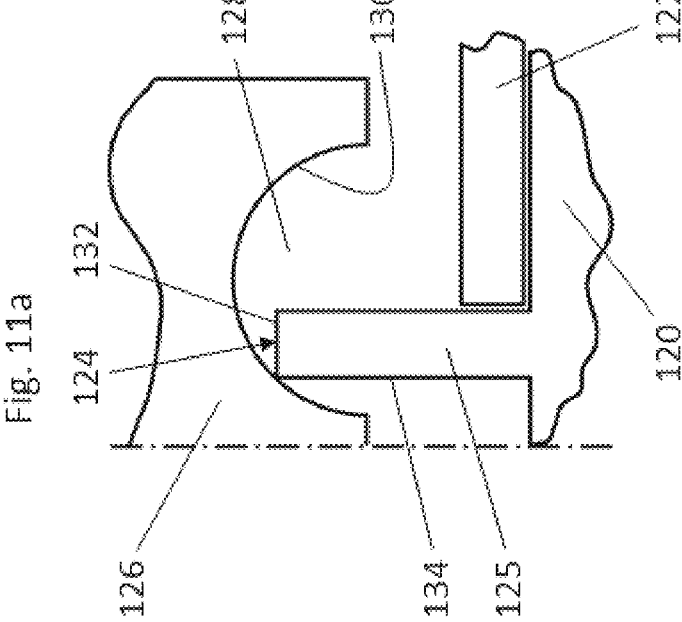
Figure 12:
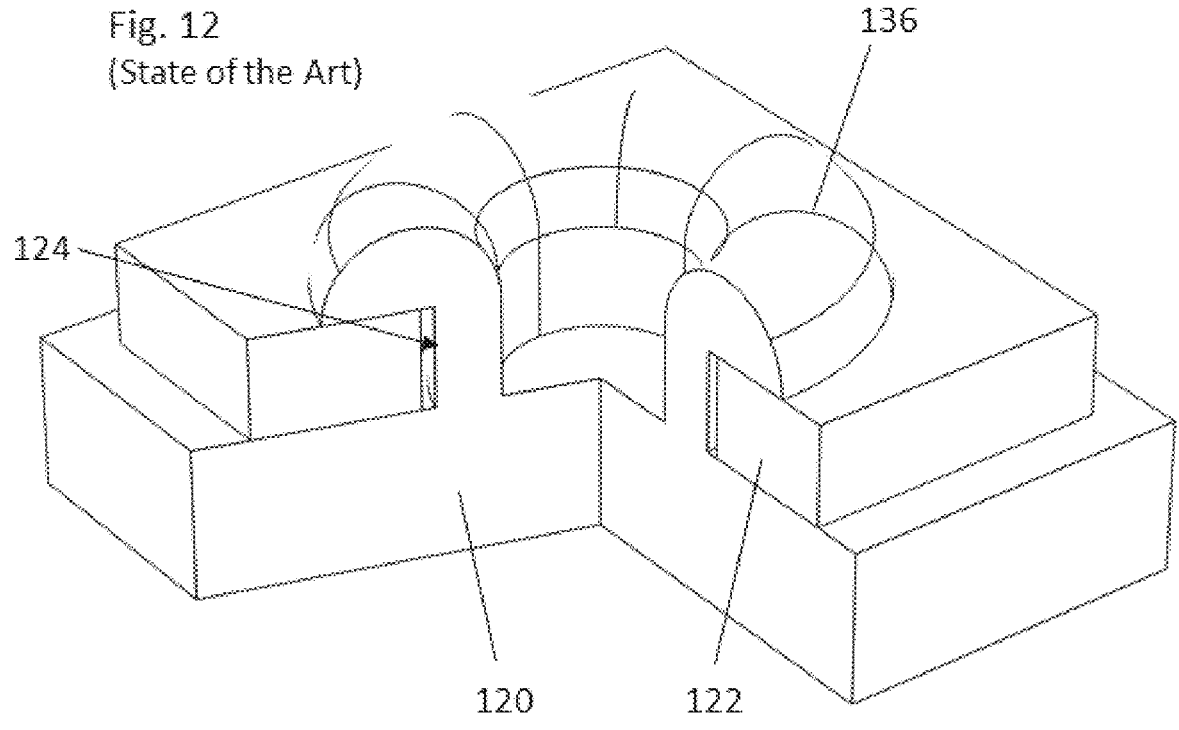
FIG. 12 shows a partially cut away perspective view of a embodiment of the closing head produced according to a method known in the art.

In FIG. 9 yet another embodiment of the system according to the invention is schematically shown in a full cross-sectional view. The system comprises a sonotrode 700 and a connecting element or rivet 702 for joining two platelike elements 703, 704. The connecting element 702 is integrally formed with the first platelike element 703 and passed through an opening arranged in the second platelike element 704.

The cross section illustrated lies in a plane including the longitudinal axis 1 commonly shared by the sonotrode 700 and the connecting element 702. The sonotrode 700 comprises a ring-shaped cavity 706 which is basically identical to the cavity according to FIGS. 3, 4 and 8. Likewise the connecting element 702 is similarly formed by a cylindrical hollow or partially hollow post consisting of a plastic and comprising a tubular cylindrical wall with an outer circumferential surface 718 and an end face 720. The base plane 726 of the sonotrode 700 cuts the cavity again under an angle≠90°, i.e. under an angle of 90°−α, relative to the longitudinal axis 1. The difference between this embodiment and the embodiment according to FIG. 8 however is that the cavity 706 circumferentially has a constant depth. Thus, the contour is sheared at the angle α.

This also results in the sonotrode 700 and the cavity 706 not having a cylindrical or rotational symmetrie although both the sonotrode 700 and the connecting element 702 have a circular base concentrically aligned with the longitudinal axis.

Both embodiments according to FIG. 8 and according to FIG. 9 demonstrate that the invention is not limited to methods or sonotrodes for reshaping connecting elements with a cylindrical symmetrie or a rotational symmetry at all.

REFERENCE SIGNS 100 first element
102 second element
104 connecting element
106 sonotrode
108 cavity
110 contac surface
112 end face
114 circumferential surface
116 closing head
118 recess
120 first element
122 second element
124 connecting element
125 tubular wall
126 sonotrode
128 cavity
130 contact surface
132 end face
134 circumferential surface
136 closing head
138 recess
200, 200' sonotrode
202, 202' cavity
204, 204' contact surface
206, 206' base plane
208, 208' apex
210, 210' minimum value
212, 212' inflection point
214, 214' outer section
300 sonotrode
302 connecting element
303 first element
304 second element
306 cavity
308 contact surface
310 first contour
312 apex
313 apex portion
314 outer section
316 tubular cylindrical wall 318 circumferential surface
320 end face
322 melt
324 initial contact point
326 base plane
328 closing head
330 upper portion
332 base portion
334 concave section
402 connecting element
403 first element
404 second element
428 closing head
430 upper portion
432 base portion
434 concave section
436 rib
502 connecting element
503 first element
504 second element
528 closing head
530 upper portion
532 base portion
534 concave section
600 sonotrode
602 connecting element
603 first element
604 second element
606 cavity
618 outer circumferential surface
620 end face
626 base plane
700 sonotrode
702 connecting element
703 first element
704 second element
706 cavity
718 outer circumferential surface
720 end face
726 base plane
α angle
l longitudinal axis
s stroke
t wall thickness
x, z coordinates

What is claimed is:

1. A sonotrode for reshaping a connecting element to form a closing head of a rivet comprising:

a cavity at least partially having the negative shape of the closing head to be formed;

wherein the cavity provides a contact surface designed to come in contact with the connecting element during reshaping;

wherein the sonotrode defines a longitudinal axis (l);

wherein the contact surface in a cross section in at least one first plane parallel to the longitudinal axis (l) comprises a first contour with a convex shaped outer section, so that a line connecting two points within the convex shaped outer section extends through the sonotrode and not through the cavity;

wherein, in the at least one first plane, the direction parallel to the longitudinal axis (l), when pointing into the cavity, defines a z-axis and the direction perpendicular to and pointing away from the z-axis defines an x-axis of a two-dimensional orthogonal coordinate system; and wherein said first contour along the convex shaped outer section, as a function of the distance to the z-axis, comprises a derivative which steadily or abruptly increases; and wherein said first contour at the beginning of the convex shaped outer section has a derivative of at most −1.2.

2. The sonotrode according to claim 1, wherein said first contour at the beginning of the convex shaped outer section has a derivative of at most −1.6.

3. The sonotrode according to claim 1, wherein said first contour at the end of the convex shaped outer section has a derivative of at least −0.7.

4. The sonotrode according to claim 1, wherein the contact surface in two or more cross sections in two or more different first planes parallel to the longitudinal axis comprises said first contour with a convex shaped outer section; and wherein an indentation is formed between each two of said two or more first planes, wherein the contact surface in a cross section in an intermediate plane between each two of said two or more first planes comprises a second contour, the second contour with regard to the first contour, in particular with regard to the convex shaped outer sections, extends outwardly in direction of the x-axis of the intermediate plane.

5. The sonotrode according to claim 1, wherein the cavity with regard to the longitudinal axis has a rotational symmetry of order n≥2 or a cylindrical or circular symmetry.

6. The sonotrode according to claim 4, wherein the cavity with regard to the longitudinal axis has a rotational symmetry of order n≥2 or a cylindrical or circular symmetry, wherein n≥2 different first planes lie in n≥2 discontinuous angular sections around the longitudinal axis and wherein an indentation is formed between each two adjacent angular sections.

7. The sonotrode according to claim 1, wherein the first contour along the x-axis first comprises an apex and then said convex shaped outer section.

8. The sonotrode according to claim 7, wherein the longitudinal axis extends through the apex.

9. A system comprising a connecting element in the form of a rivet and the sonotrode according to claim 7, the connecting element defining a longitudinal axis being aligned with the longitudinal axis of the sonotrode and being at least partially formed by either a tubular wall or a solid post with an outer circumferential surface and an end face;

wherein the sonotrode and the connecting element are arranged to be movable along the longitudinal axis relative to each other;

and wherein the first contour comprises an apex portion surrounding the apex and being arranged to initially get in contact with the connecting element at the end face thereof or in a transition section between the outer circumferential surface and the end face, when the sonotrode and the connecting element are moved relative towards each other.

10. A system comprising a connecting element in the form of a rivet and the sonotrode according to claim 7, the connecting element defining a longitudinal axis being aligned with the longitudinal axis of the sonotrode and being at least partially formed by either a tubular wall or a solid post with an outer circumferential surface and an end face;

wherein the sonotrode and the connecting element are arranged to be movable along the longitudinal axis relatively to each other;

wherein the first contour comprises an apex portion, the apex portion surrounding the apex and being arranged, upon initial contact between the sonotrode and the connecting element, to face the end face of the connecting element, and wherein the convex shaped outer section, upon initial contact, faces at least a part of the outer circumferential surface of the connecting element; and wherein, when the sonotrode and the connecting element are moved from the initial contact further relative towards each other in a direction along the longitudinal axis over a stroke (s), the convex shaped outer section is formed to direct melt to flow along and in permanent contact to the outer circumferential surface of the connecting element over the at least initial 15% of said stroke (s).

11. A system comprising a connecting element in the form of a rivet and the sonotrode according to claim 1, the connecting element defining a longitudinal axis being aligned with the longitudinal axis of the sonotrode and being at least partially formed by either a tubular wall or a solid post with an outer circumferential surface and an end face, the tubular wall at the end face having a wall thickness t or the solid post at the end face having a minimum width w;

wherein for more than 50% of points in the cavity either 1) the width of the cavity along the x-axis, through the respective point is less than two times the wall thickness t or less than half of the minimum width w, or 2) the height of the cavity along the longitudinal axis through the respective point is less than the wall thickness t or less than a fourth of the minimum width w.

12. The system according to claim 9, wherein the connecting element consists of PP, ABS, ABS/PC, TPO, PA, PET and PEEK, optionally including fibers or particles being dispersed therein.

13. A method of reshaping a connecting element to form a closing head, the method comprising:

providing a connecting element in the form of a rivet, the connecting element defining a longitudinal axis and being at least partially formed by either a tubular wall or a solid post with an outer circumferential surface and an end face;

providing a sonotrode aligned with the longitudinal axis, the sonotrode having a cavity, the cavity at least partially having the negative shape of the closing head to be formed, wherein the cavity provides a contact surface designed to come in contact with the connecting element during reshaping;

initially bringing the contact surface of the sonotrode in contact with the connecting element at the end face or in a transition section between the outer circumferential surface and the end face;

applying an ultrasonic vibration via said sonotrode to the connecting element thereby initially softening or melting the material of the connecting element at the end face or in the transition section between the outer circumferential surface and the end face;

after bringing the contact surface of the sonotrode in contact with the connecting element, moving said sonotrode and the connecting element relative towards each other over a stroke (s) in a direction along the longitudinal axis, thereby direct softened material or melt to flow along and in permanent contact to the outer circumferential surface of the connecting element over at least 15% of said stroke (s).

14. The method according to claim 13, wherein the melt after flowing along and in contact to the outer circumferential surface of the connecting element is deflected to flow in a direction away from the outer circumferential surface of the connecting element.

15. The method according to claim 13, wherein the sonotrode is a sonotrode comprising:

a cavity at least partially having the negative shape of the closing head to be formed;

wherein the cavity provides a contact surface designed to come in contact with the connecting element during reshaping;

wherein the sonotrode defines a longitudinal axis (l);

wherein the contact surface in a cross section in at least one first plane parallel to the longitudinal axis (l) comprises a first contour with a convex shaped outer section, so that a line connecting two points within the convex shaped outer section extends through the sonotrode and not through the cavity;

wherein, in the at least one first plane, the direction parallel to the longitudinal axis (l), when pointing into the cavity, defines a z-axis and the direction perpendicular to and pointing away from the z-axis defines an x-axis of a two-dimensional orthogonal coordinate system; and wherein said first contour along the convex shaped outer section, as a function of the distance to the z-axis, comprises a derivative which steadily or abruptly increases; and wherein said first contour at the beginning of the convex shaped outer section has a derivative of at most −1.2.

16. The sonotrode according to claim 1, wherein said first contour at the end of the convex shaped outer section has a derivative of at least −0.7, wherein the contact surface in two or more cross sections in two or more different first planes parallel to the longitudinal axis comprises said first contour with a convex shaped outer section; and wherein an indentation is formed between each two of said two or more first planes, wherein the contact surface in a cross section in an intermediate plane between each two of said two or more first planes comprises a second contour, the second contour with regard to the first contour, in particular with regard to the convex shaped outer sections, extends outwardly in direction of the x-axis of the intermediate plane, and wherein the cavity with regard to the longitudinal axis has a rotational symmetry of order n≥2 or a cylindrical or circular symmetry.

17. The sonotrode according to claim 16, wherein n≥2 different first planes lie in n≥2 discontinuous angular sections around the longitudinal axis and wherein an indentation is formed between each two adjacent angular sections, wherein the first contour along the x-axis first comprises an apex and then said convex shaped outer section, and wherein the longitudinal axis extends through the apex.

18. A system comprising a connecting element in the form of a rivet and the sonotrode according to claim 17, the connecting element defining a longitudinal axis being aligned with the longitudinal axis of the sonotrode and being at least partially formed by either a tubular wall or a solid post with an outer circumferential surface and an end face, the tubular wall at the end face having a wall thickness t or the solid post at the end face having a minimum width w;

wherein for more than 50% of points in the cavity either 1) the width of the cavity along the x-axis, through the respective point is less than two times the wall thickness t or less than half of the minimum width w, or 2) the height of the cavity along the longitudinal axis through the respective point is less than the wall thickness t or less than a fourth of the minimum width w.

19. A method of reshaping a connecting element to form a closing head, the method comprising:

providing a connecting element in the form of a rivet, the connecting element defining a longitudinal axis and being at least partially formed by either a tubular wall or a solid post with an outer circumferential surface and an end face;

providing the sonotrode according to claim 17, aligned with the longitudinal axis, the sonotrode having a cavity, the cavity at least partially having the negative shape of the closing head to be formed, wherein the cavity provides a contact surface designed to come in contact with the connecting element during reshaping;

initially bringing the contact surface of the sonotrode in contact with the connecting element at the end face or in a transition section between the outer circumferential surface and the end face;

applying an ultrasonic vibration via said sonotrode to the connecting element thereby initially softening or melting the material of the connecting element at the end face or in the transition section between the outer circumferential surface and the end face;

after bringing the contact surface of the sonotrode in contact with the connecting element, moving said sonotrode and the connecting element relative towards each other over a stroke (s) in a direction along the longitudinal axis, thereby direct softened material or melt to flow along and in permanent contact to the outer circumferential surface of the connecting element over at least 15% of said stroke (s).

\*   \*   \*   \*   \*